US011725372B2

(12) United States Patent
Mei

(10) Patent No.: US 11,725,372 B2
(45) Date of Patent: Aug. 15, 2023

(54) DRAINAGE ASSEMBLY AND SINK

(71) Applicant: NINGBO MENGO KITCHEN EQUIPMENT CO., LTD, Ningbo (CN)

(72) Inventor: Zurui Mei, Ningbo (CN)

(73) Assignee: NINGBO MENGO KITCHEN EQUIPMENT CO., LTD, Ningbo (CN)

( * ) Notice: Subject to any disclaimer, the term of this patent is extended or adjusted under 35 U.S.C. 154(b) by 0 days.

(21) Appl. No.: 17/790,767

(22) PCT Filed: Mar. 19, 2021

(86) PCT No.: PCT/CN2021/081749
§ 371 (c)(1),
(2) Date: Jul. 5, 2022

(87) PCT Pub. No.: WO2022/041697
PCT Pub. Date: Mar. 3, 2022

(65) Prior Publication Data
US 2023/0013639 A1    Jan. 19, 2023

(30) Foreign Application Priority Data
Aug. 28, 2020   (CN) .................. 202010882553.X

(51) Int. Cl.
*E03C 1/232* (2006.01)
*E03C 1/182* (2006.01)
(Continued)

(52) U.S. Cl.
CPC .............. *E03C 1/232* (2013.01); *E03C 1/182* (2013.01); *G01F 23/60* (2013.01); *E03C 2001/2311* (2013.01)

(58) Field of Classification Search
CPC .. E03C 1/232; E03C 1/182; E03C 2001/2311; G01F 23/60
(Continued)

(56) References Cited

U.S. PATENT DOCUMENTS 203,745 A * 5/1878 Leverty .................. E03C 1/232
4/295
332,911 A * 12/1885 Lane ....................... E03C 1/232
4/681
(Continued)

FOREIGN PATENT DOCUMENTS

CN         107773188 A      3/2018
CN         207863063 U      9/2018
(Continued)

*Primary Examiner* — Benjamin R Shaw
(74) *Attorney, Agent, or Firm* — Bayramoglu Law Offices LLC

(57) ABSTRACT

A drainage assembly and a sink are provided. The drainage assembly includes a base body. Two ends of the base body are provided with an input port and an output port respectively. The input port is communicated with the output port by a flow channel located in the base body. The flow channel includes an upper chamber communicated with the input port and a lower chamber communicated with the output port. The base body is provided with a switch mechanism configured to control connection and disconnection between the upper chamber and the lower chamber. The base body is provided with a water inlet connector and a liquid level measurement connector that are separately communicated with the upper chamber. The drainage assembly and the sink have liquid level measurement and water supply functions in addition to a drainage function.

15 Claims, 12 Drawing Sheets

(51) Int. Cl.
*G01F 23/60* (2006.01)
*E03C 1/23* (2006.01)

(58) Field of Classification Search
USPC .................................................. 4/651
See application file for complete search history.

(56) References Cited

U.S. PATENT DOCUMENTS

| | | | | | |
|---|---|---|---|---|---|
| 380,082 | A | * | 3/1888 | Boyd | E03C 1/23 |
| | | | | | 137/247.23 |
| 380,083 | A | * | 3/1888 | Boyd | E03C 1/23 |
| | | | | | 137/247.23 |
| 434,689 | A | * | 8/1890 | Wade | E03C 1/232 |
| | | | | | 285/298 |
| 497,465 | A | * | 5/1893 | Burgoin | E03C 1/2306 |
| | | | | | 137/247.13 |
| 526,666 | A | * | 9/1894 | Marquis | E03C 1/232 |
| | | | | | 137/247.23 |
| 559,188 | A | * | 4/1896 | Moore | E03C 1/232 |
| | | | | | 285/379 |
| 971,839 | A | * | 10/1910 | Hartness | E03C 1/232 |
| | | | | | 4/686 |
| 1,136,091 | A | * | 4/1915 | Bloom | E03C 1/23 |
| | | | | | 4/651 |
| 2,584,423 | A | * | 2/1952 | Collison | E03C 1/182 |
| | | | | | 285/125.1 |
| 4,615,053 | A | * | 10/1986 | Masalin | E03C 1/182 |
| | | | | | 4/640 |
| 4,969,217 | A | * | 11/1990 | Gandini | E03C 1/232 |
| | | | | | 4/686 |
| 2009/0260154 | A1 | * | 10/2009 | Shoop | E03C 1/232 |
| | | | | | 4/680 |
| 2011/0000014 | A1 | * | 1/2011 | Ball | E03C 1/232 |
| | | | | | 4/679 |
| 2015/0299994 | A1 | * | 10/2015 | McAlpine | E03C 1/232 |
| | | | | | 4/694 |
| 2016/0177554 | A1 | * | 6/2016 | Yu | E03C 1/2304 |
| | | | | | 4/685 |
| 2019/0055723 | A1 | * | 2/2019 | McAlpine | E03C 1/232 |
| 2021/0010252 | A1 | * | 1/2021 | Preisig | E03C 1/2304 |

FOREIGN PATENT DOCUMENTS

| | | |
|---|---|---|
| CN | 210810859 U | 6/2020 |
| CN | 112031097 A | 12/2020 |
| JP | 2009155917 A | 7/2009 |
| KR | 20080081572 A | 9/2008 |

* cited by examiner

DRAINAGE ASSEMBLY AND SINK

CROSS REFERENCE TO THE RELATED APPLICATIONS

This application is the national phase entry of International Application No. PCT/CN2021/081749, filed on Mar. 19, 2021, which is based upon and claims priority to Chinese Patent Application No. 202010882553.X, filed on Aug. 28, 2020, the entire contents of which are incorporated herein by reference.

TECHNICAL FIELD

The present disclosure relates to the technical field of drainage devices, and in particular, to a drainage assembly and a sink.

BACKGROUND

The drainage assembly, also known as a drainer, is an important component on a sink. The prior drainers mostly connect a water outlet of the sink to a drainage tube to perform drainage, so the function is relatively single. Especially with the technological development of prior sinks, it has become a development trend of sinks to integrate various mechanisms or electrical equipment on the sink, such as sink-type dishwashers and sink-type fruit and vegetable machines. Such sinks in the prior art are often required to have more functions, such as automatic water inlet and overflow alarm. Although the above functions can be realized one by one by adding additional water inlets or overflow alarms on such sinks in the prior art, the degree of integration of components is low. The components need to be installed independently, which brings inconvenience to installation, and more installation holes need to be additionally arranged on the sink, which affects the strength of the sink. In addition, it is inconvenient to retrofit the original sink. Therefore, there is an urgent need in the prior art for a device that does not require additional holes in the sink, is easy to install, and has a high degree of integration to meet the requirements of water inlet, drainage, and overflow monitoring in the sink.

SUMMARY

The present disclosure aims to solve a first technical problem in the related art at least to a certain extent: to provide a drainage assembly, which has liquid level measurement and water supply functions in addition to a drainage function.

Therefore, an objective of the present disclosure is to provide a drainage assembly, including a base body. Two ends of the base body are provided with an input port and an output port respectively. The input port is communicated with the output port by a flow channel located in the base body. The flow channel includes an upper chamber communicated with the input port and a lower chamber communicated with the output port. The base body is provided with a switch mechanism configured to control connection and disconnection between the upper chamber and the lower chamber. The base body is provided with a water inlet connector and a liquid level measurement connector that are separately communicated with the upper chamber.

The base body may be arranged in a vertical direction; the input port may be located at an upper end of the base body, and the output port may be located at a lower end of the base body. The water inlet connector may be located above the liquid level measurement connector in the vertical direction.

Projection lines of axes of the water inlet connector and the liquid level measurement connector in a same horizontal plane may intersect, and the two projection lines may have an included angle greater than 45°.

A bottom of the upper chamber may shrink inward in a horizontal direction to form a narrow region. A cross-sectional area of the narrow region in the horizontal direction may be less than a cross-sectional area of the upper chamber located above the narrow region. The switch mechanism may be arranged between the narrow region of the upper chamber and the lower chamber to connect or disconnect the narrow region and the lower chamber. The liquid level measurement connector may be communicated with the narrow region.

An inner side wall of the narrow region may be transitionally connected to an inner side wall of the upper chamber located above the narrow region through a transition surface. The transition surface may be inclined. An end of the transition surface connected to the inner side wall of the upper chamber may be higher than the other end of the transition surface connected to the inner side wall of the narrow region in the vertical direction.

The water inlet connector may face the transition surface.

The present disclosure aims to solve a second technical problem in the related art at least to a certain extent: to provide a sink, which can not only drain water stored in the sink through the drainage assembly, but also supply water through the drainage assembly and measure a liquid level height of the water stored in the sink through the drainage assembly.

Therefore, an objective of the present disclosure is to provide a sink, including at least one fruit and vegetable sink. A bottom of the fruit and vegetable sink is provided with a water outlet. The drainage assembly as described above is installed at the bottom of the fruit and vegetable sink.

The input port of the drainage assembly is communicated with the water outlet at the bottom of the fruit and vegetable sink, and the output port of the drainage assembly is communicated with a drainage tube.

The water inlet connector of the drainage assembly is communicated with a water supply tube, and the liquid level measurement connector of the drainage assembly is connected to a monitoring mechanism configured to monitor a liquid level height in the fruit and vegetable sink.

An overflow device may be installed on an outer side of a wall of the fruit and vegetable sink. A measurement flow channel may be arranged in the overflow device. A lower end of the measurement flow channel may be communicated with the liquid level measurement connector on the drainage assembly, and an upper end of the measurement flow channel may be communicated with an inner cavity of the fruit and vegetable sink. The monitoring mechanism may be arranged on the overflow device, and may be configured to monitor a liquid level height in the measurement flow channel.

The monitoring mechanism may include a floater arranged in the measurement flow channel, and a monitoring unit arranged on the overflow device and configured to monitor a position of the floater.

The monitoring unit may include a magnetic element arranged on the floater and a plurality of Hall elements or a plurality of reed switches arranged on the overflow device, and all of the Hall elements or all of the reed switches may be arranged sequentially in a length direction of the measurement flow channel.

Additional aspects and advantages of the present disclosure will be partly provided in the following description, and partly become evident in the following description or are understood through the practice of the present disclosure.

The above technical solution has the following advantages or beneficial effects: water stored in the fruit and vegetable sinks can be drained through the drainage assembly, such that the drainage assembly has a drainage function, and when the switch mechanism is closed, clean water is fed into the fruit and vegetable sink through the water inlet connector to achieve water supply. In addition, the monitoring mechanism is selectively opened, and the liquid level in the fruit and vegetable sink is monitored by the monitoring mechanism to realize the liquid level measurement function and finally realize diversification of functions through the drainage assembly.

Figure 1:
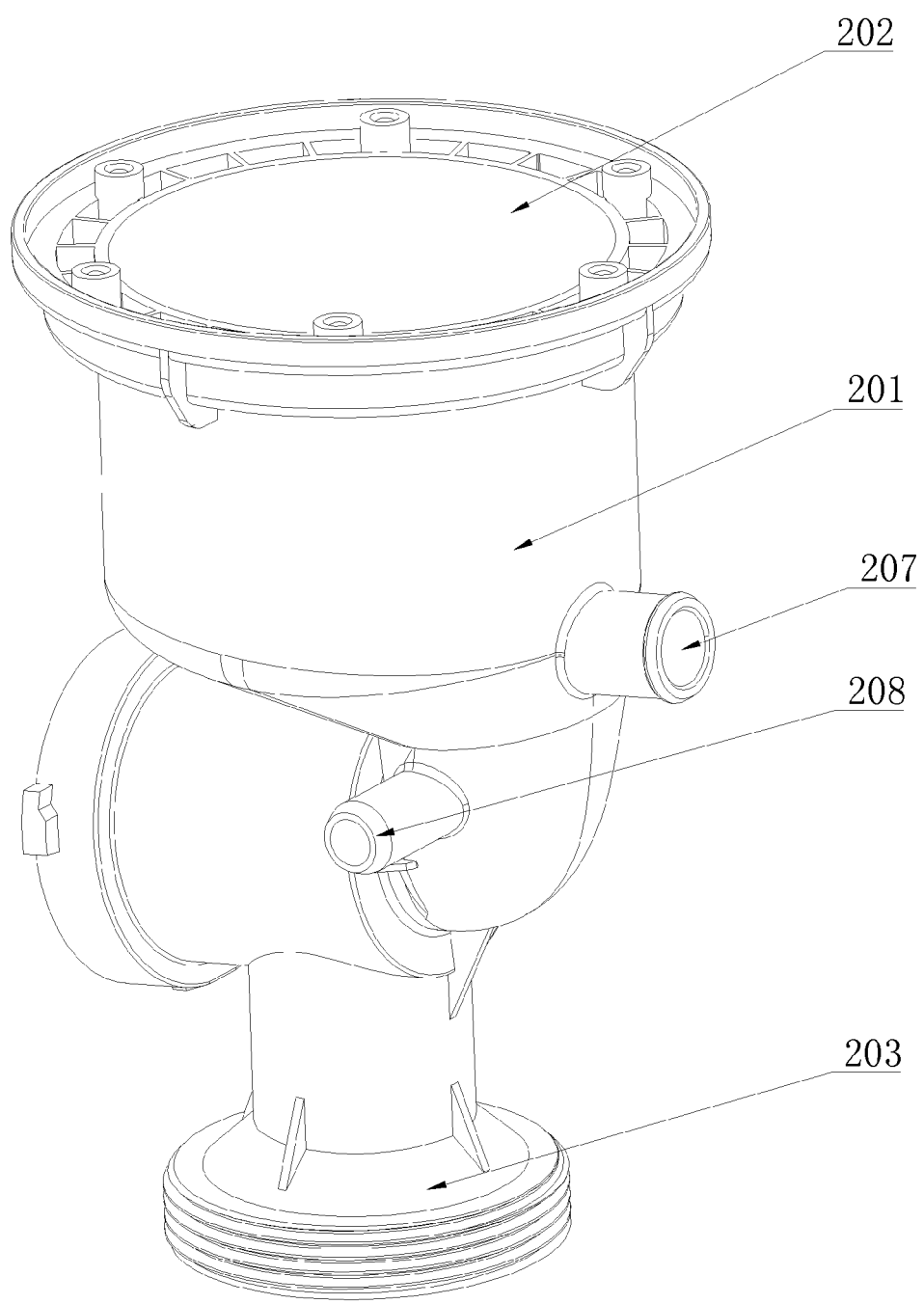
FIG. 1 is a schematic structural diagram of a drainage assembly of the present disclosure.

Reference numerals: 100, fruit and vegetable sink; 200, drainage assembly; 300, overflow device; 400, cleaning sink; 500, water supply tube; and 600, measurement water tube;

201, base body; 202, input port; 203, output port; 204, upper chamber; 204-1, narrow region; 205, lower chamber; 206, switch mechanism; 207, water inlet connector; 208, liquid level measurement connector; 209, transition surface; 210, connecting channel; and 211, switch installation cavity; and 301, shell; 301-1, bottom shell; 301-2, cover plate; 302, overflow channel; 303, overflow port; 304, drainage port; 305, measurement flow channel; 306, liquid level connector; 307, transition cavity; 307-1, first connecting port; 307-2, second connecting port; 308, connecting tubing; 309, floater; 310, installation plate; and 311, water tube.

DETAILED DESCRIPTION OF THE EMBODIMENTS

The embodiments of the present disclosure are described below in detail. Examples of the embodiments are shown in the drawings. The same or similar numerals represent the same or similar elements or elements having the same or similar functions throughout the specification. The embodiments described below with reference to the drawings are illustrative, which are merely intended to explain the present disclosure, rather than to limit the present disclosure.

A drainage assembly and a sink according to embodiments of the present disclosure will be described in detail below with reference to the accompanying drawings.

Figure 4:
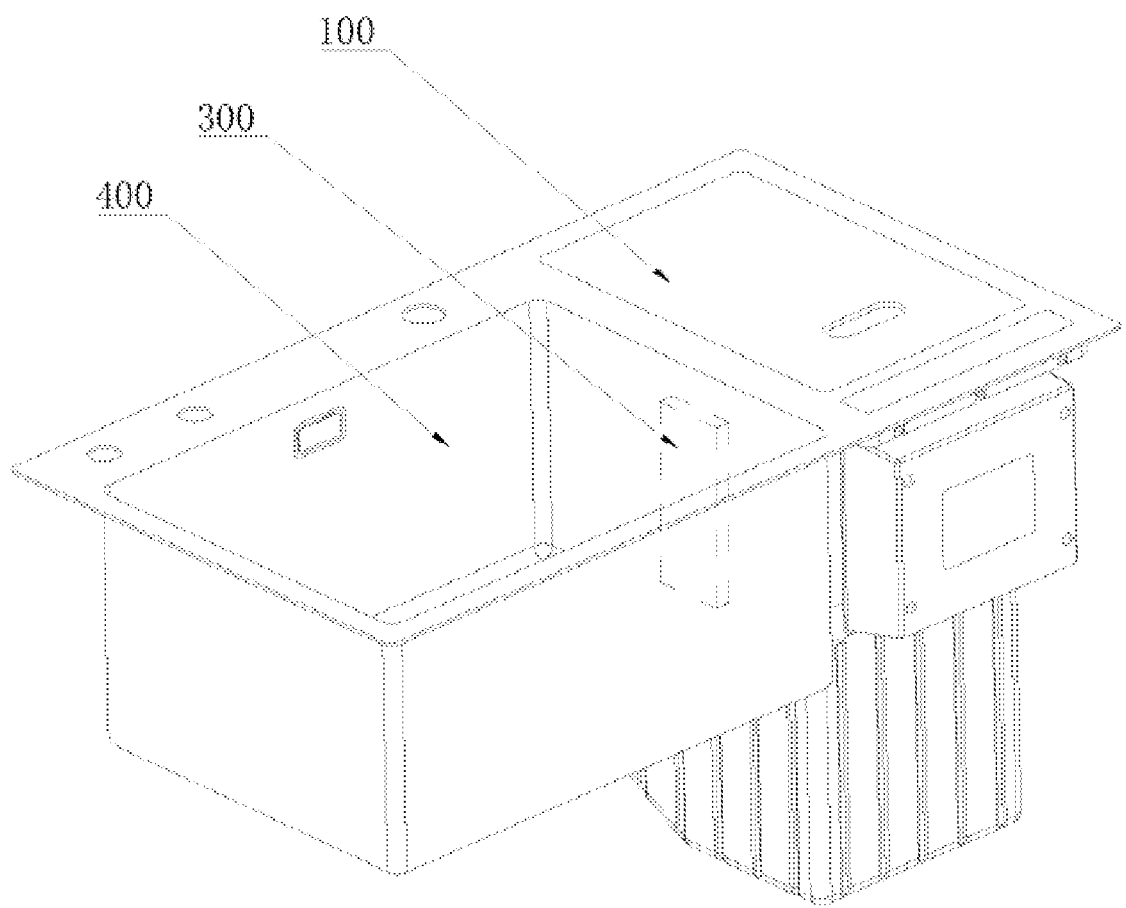
FIG. 4 is a schematic structural diagram I of a sink of the present disclosure.

The direction of FIG. 4 herein refers to an axial schematic view of a cleaning sink 400 with an upper end surface, a left side surface, and a front side surface all shown.

Figure 5:
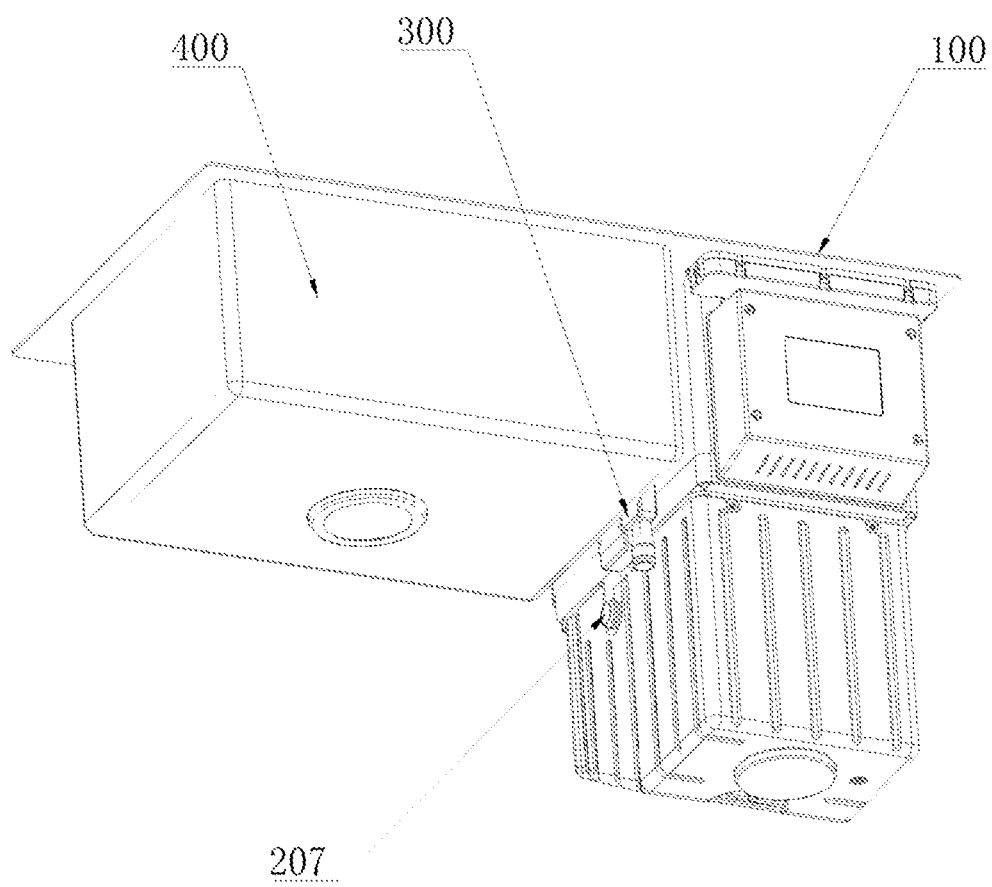
FIG. 5 is a schematic structural diagram II of the sink of the present disclosure.
Figure 6:
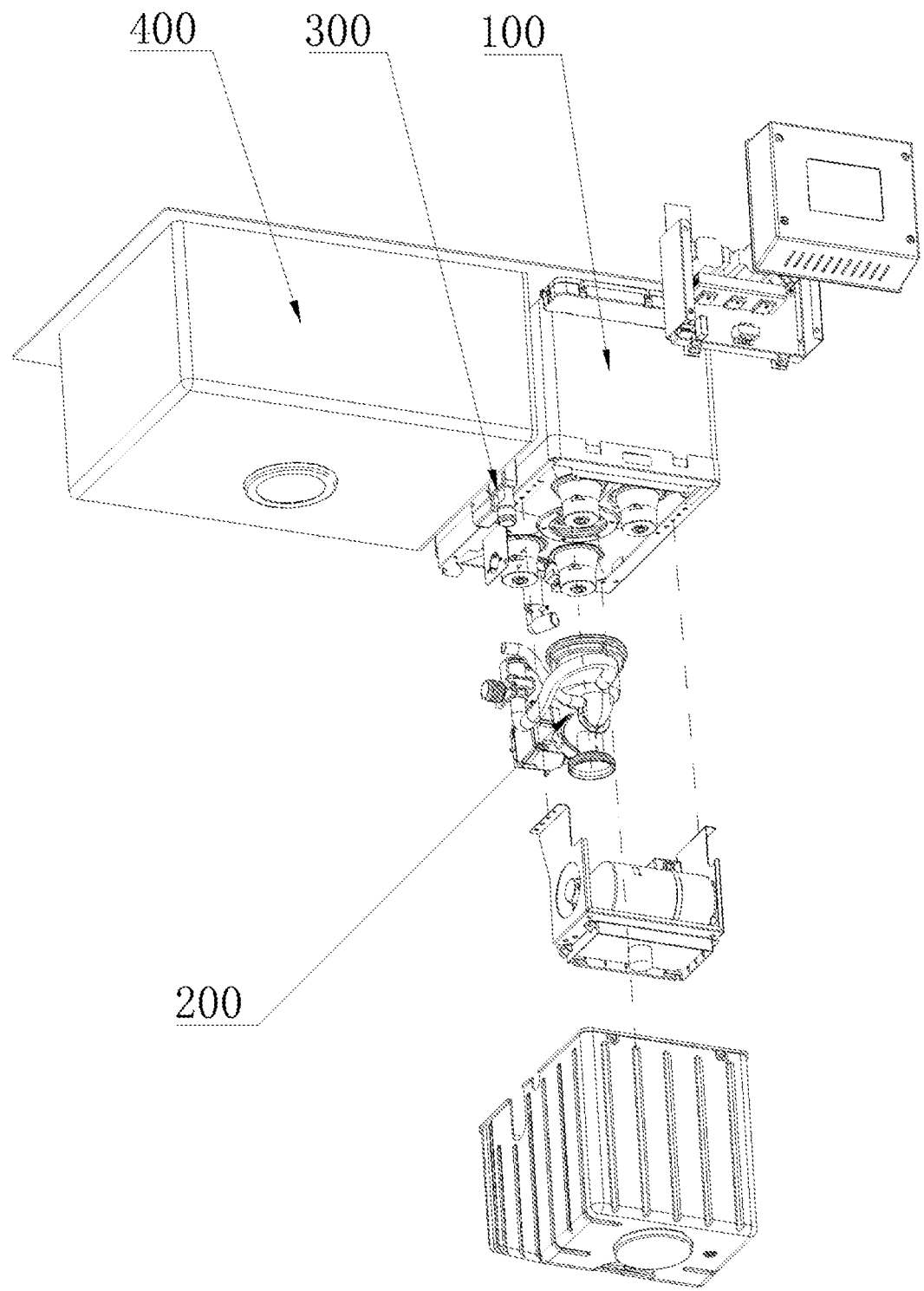
FIG. 6 is an explosion diagram of FIG. 5.
Figure 7:
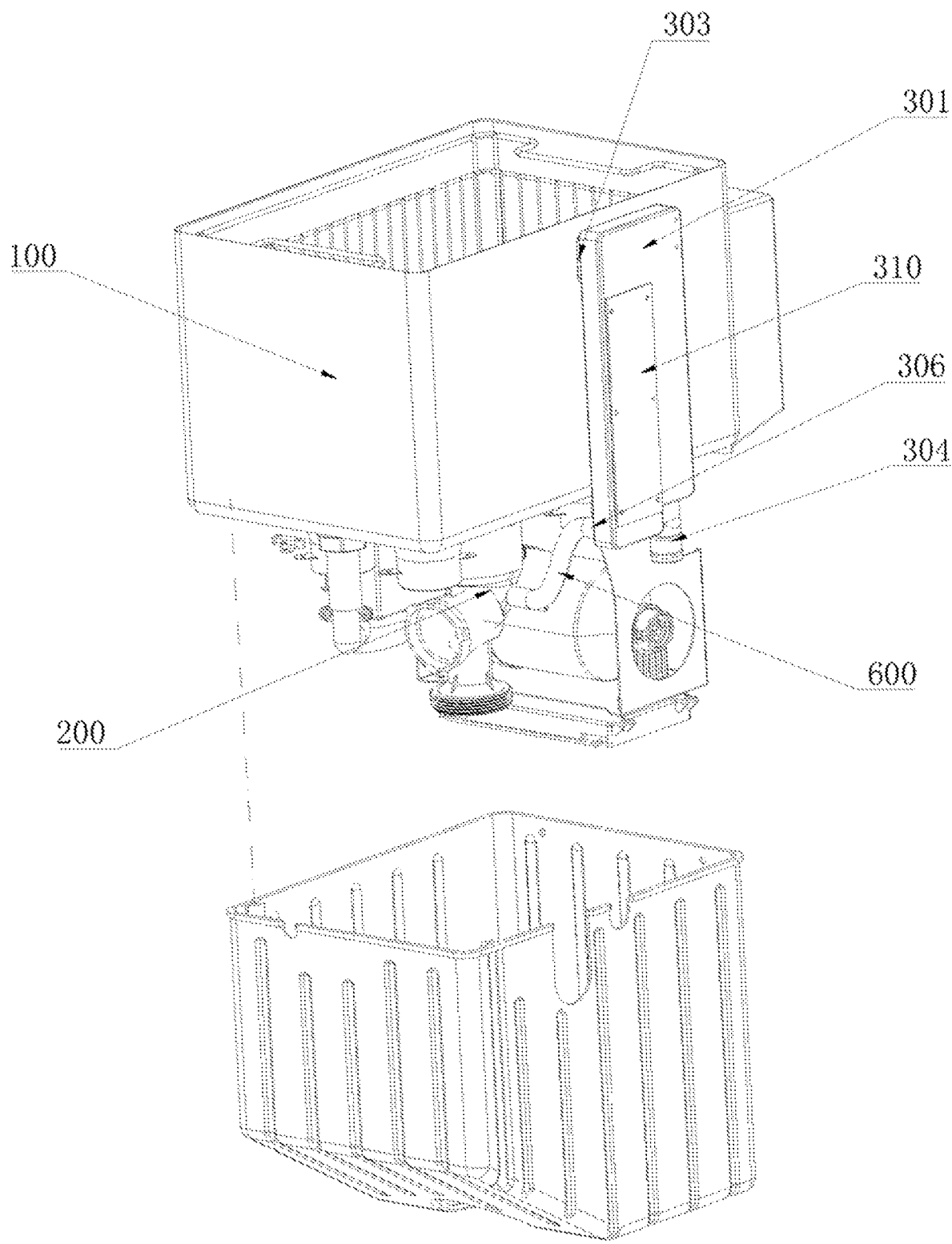
FIG. 7 is a schematic structural diagram of a position of the drainage assembly in the sink of the present disclosure.

The direction of FIG. 5 herein refers to an axial schematic view of the cleaning sink 400 with a lower end surface, the left side surface, and the front side surface all shown.

Embodiment I

The present disclosure provides a sink, as shown in FIG. 4, which includes two sink bodies arranged side by side, one of which is a cleaning sink 400, and the other is a fruit and vegetable sink 100. The fruit and vegetable sink 100 is integrated with an embedded fruit and vegetable machine, also known as a sink-type fruit and vegetable machine. The above two sinks can be called double sink structures; in the prior art, the cleaning sink can also be excluded, and only the single sink structure of the fruit and vegetable sink 100 can be retained. Even a plurality of cleaning sinks or sinks with other functions can be arranged, so as to form a multi-sink structure, and further, an overflow device 300 is installed on an outer side wall of the fruit and vegetable sink 100, such that when the water in the fruit and vegetable sink 100 is overfilled, it can overflow through the overflow device 300. A drainage assembly 200 is installed at a bottom of the fruit and vegetable sink 100, and the drainage assembly 200 is also called a drainer, which is configured to drain the water in the sink body of the fruit and vegetable sink 100.

Specifically, two ends of the drainage assembly 200 are provided with an input port 202 and an output port 203 respectively. The input port 202 is communicated with a water outlet at the bottom of the fruit and vegetable sink 100, and the output port 203 is communicated with a drainage tube. In addition, the drainage assembly 200 is integrated with a water inlet function unit for external clean water to enter the fruit and vegetable sink 100 and a water level monitoring unit configured to measure a water level height in the fruit and vegetable sink 100.

Embodiment II

Figure 2:
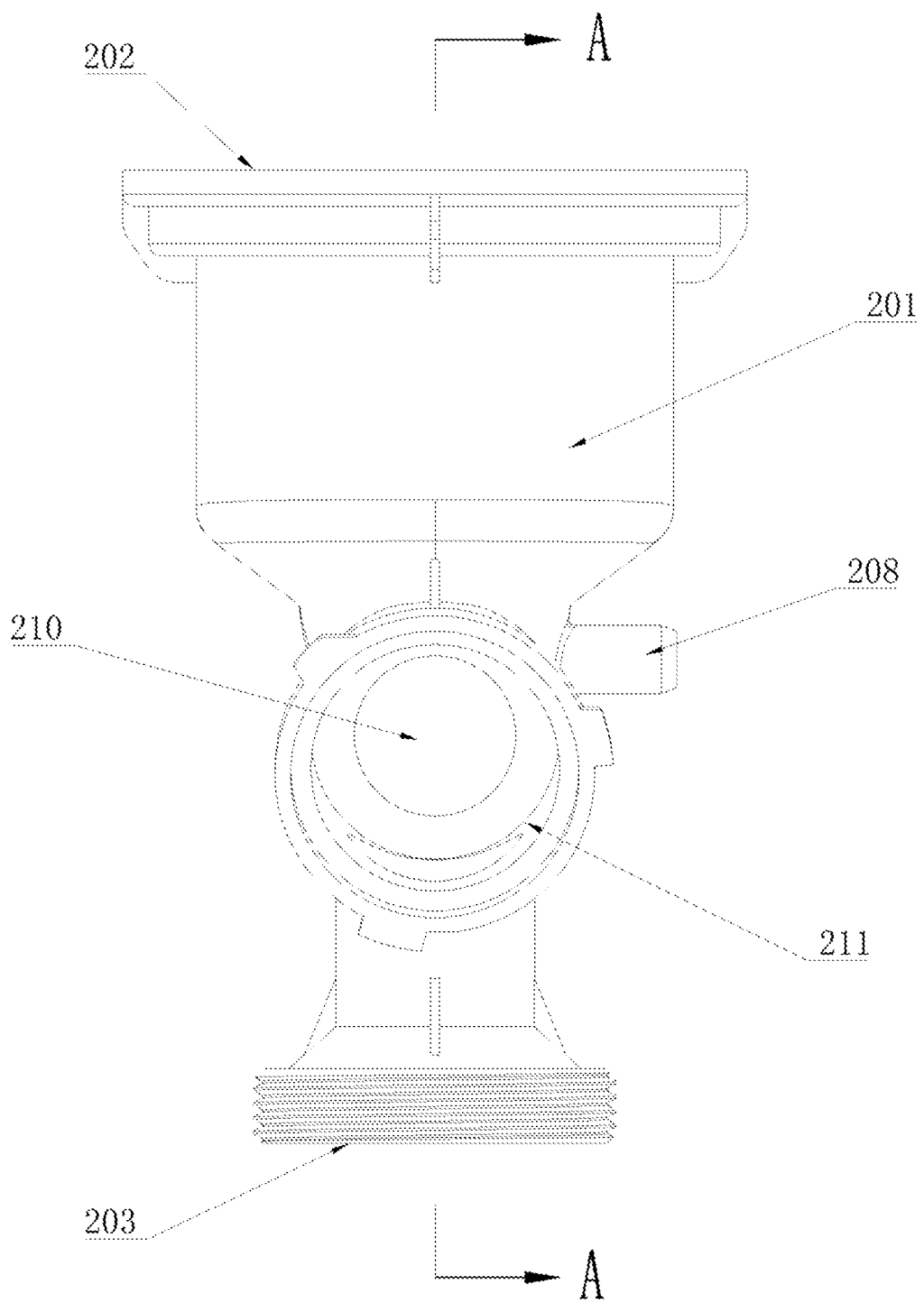
FIG. 2 is a schematic side view of the drainage assembly of the present disclosure.
Figure 3:
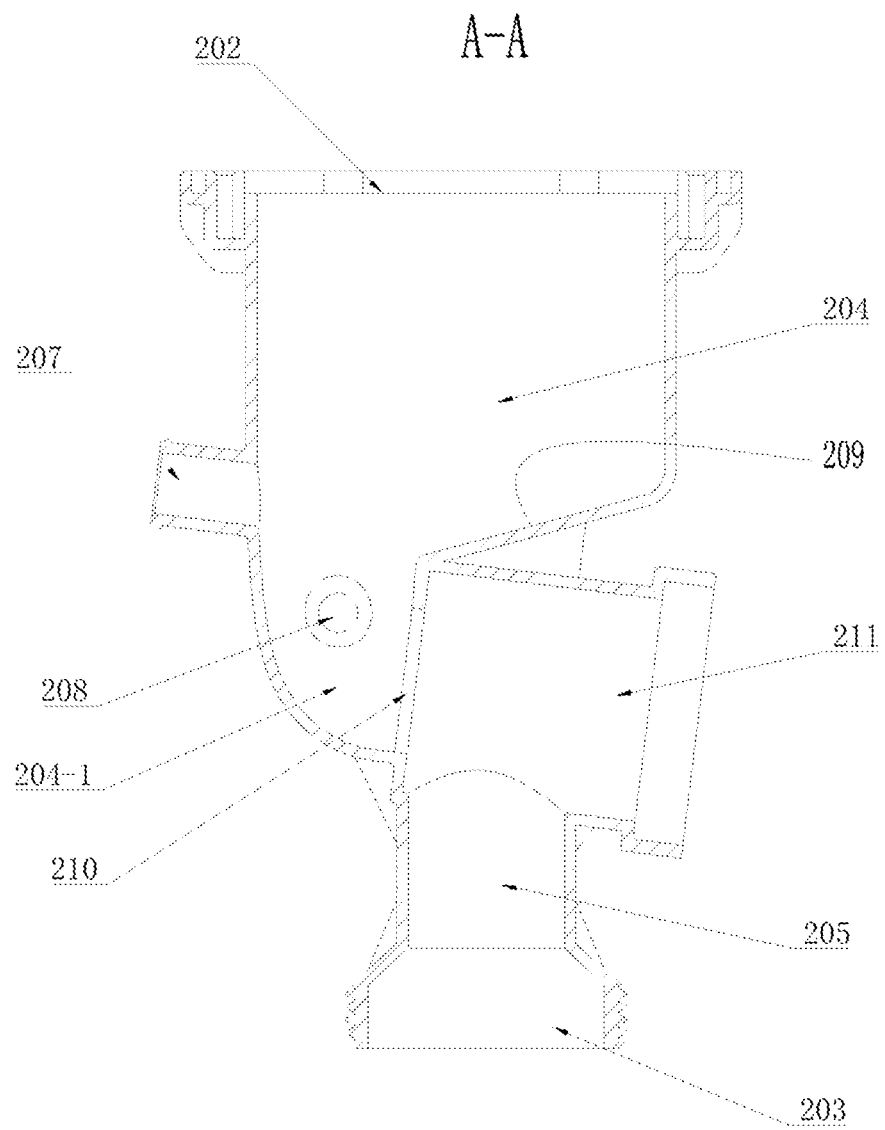
FIG. 3 is a cross-sectional view in an "A-A" direction in FIG. 2.
Figure 8:
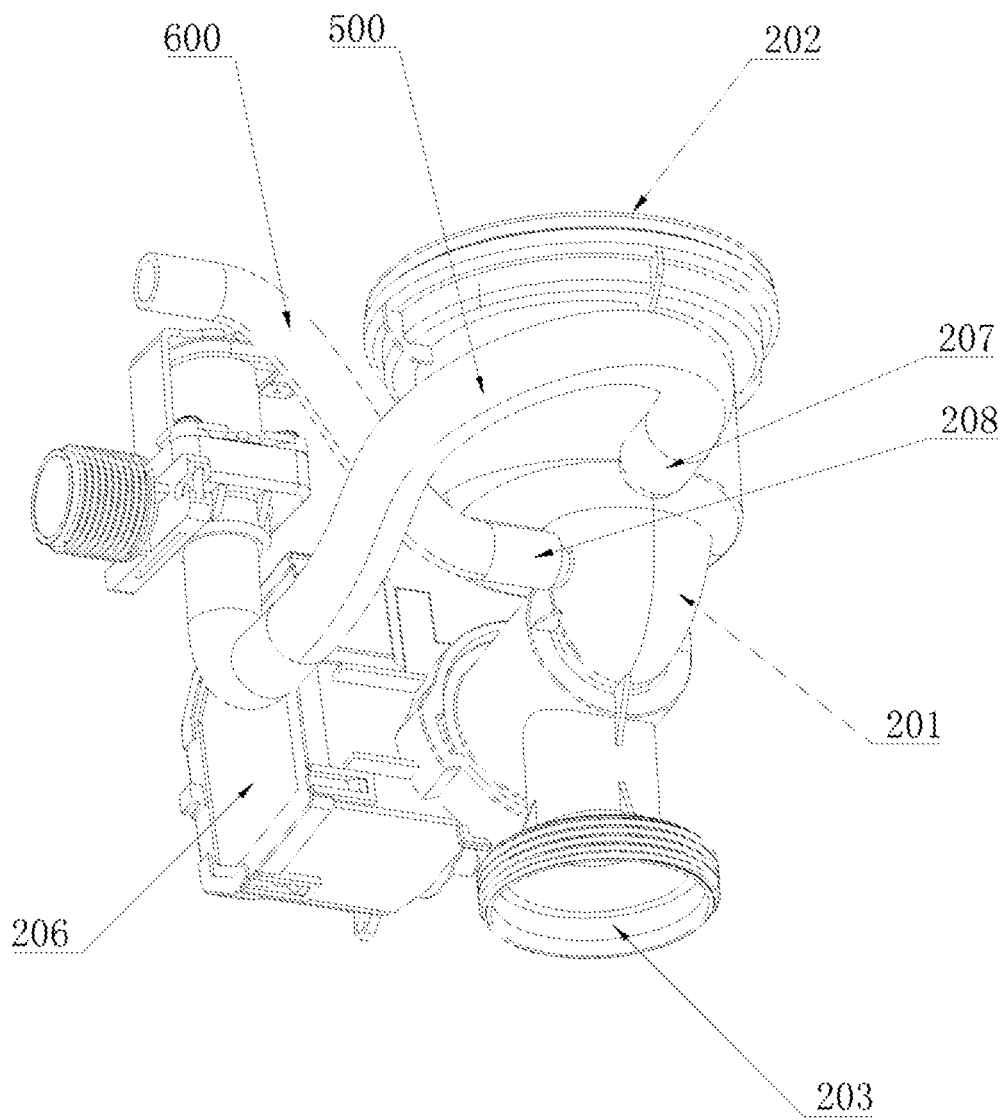
FIG. 8 is a schematic structural diagram of the drainage assembly of the present disclosure after a water supply tube and a liquid level water tube are installed.
Figure 9:
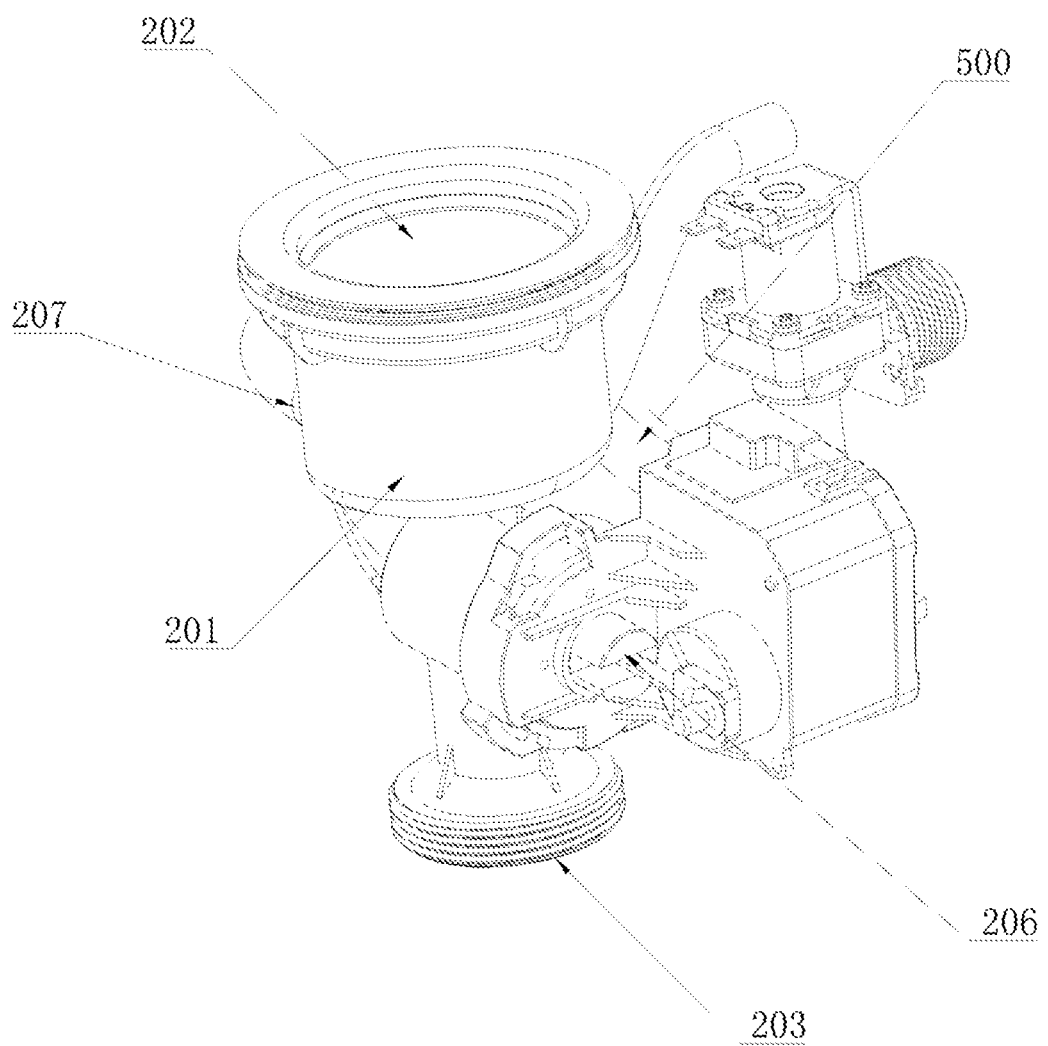
FIG. 9 is a schematic structural diagram in an opposite direction to that of FIG. 8.
Figure 10:
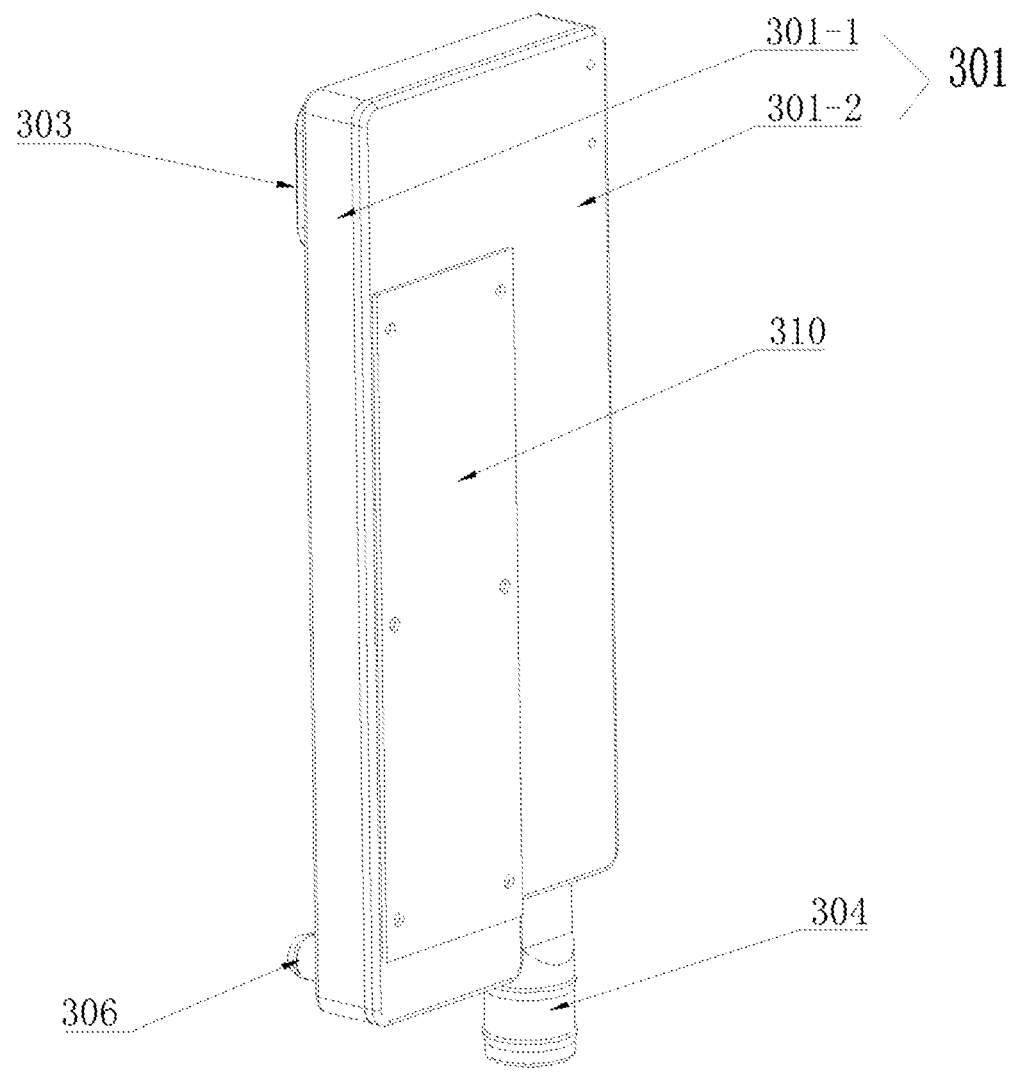
FIG. 10 is a schematic structural diagram of an overflow device of the present disclosure.

In order to make the drainage assembly 200 in Embodiment I have a function of automatic on-off opening and closing in addition to the drainage function, the difference between the present embodiment and Embodiment I is: as shown in FIG. 1 to FIG. 3, the drainage assembly 200 includes a base body 201. Two ends of the base body 201 are provided with an input port 202 and an output port 203 respectively. The input port 202 is communicated with the output port 203 by a flow channel located in the base body 201. The flow channel includes an upper chamber 204 communicated with the input port 202 and a lower chamber 205 communicated with the output port 203. A connecting channel 210 is arranged between the upper chamber 204 and the lower chamber 205. A switch installation cavity 211 extending to the connecting channel 210 is arranged on the base body 201. The switch installation cavity 211 shown in combination with FIG. 8 and FIG. 9 is provided with a switch mechanism 206 configured to open and close the connecting channel 210.

Preferably, the switch mechanism is a piston driven by a motor, and an output shaft of the motor drives the piston to reciprocate in an axial direction of the switch installation cavity 211 through a cam mechanism, such that the piston moves toward the position of the connecting channel 210 to block the connecting channel 210, or moves toward a position away from the connecting channel 210 until the connecting channel 210 is unblocked, that is, the upper chamber 204 can be communicated with the lower chamber 205 through the connecting channel 210.

Preferably, the switch mechanism 206 is a solenoid valve, and the solenoid valve realizes movement of a valve core through its own on and off, so as to realize switching of opening and closing of the connecting channel 210 through the movement of the valve core.

Embodiment III

In order to realize the diversification of functions of the drainage assembly 200, the difference between the present embodiment and Embodiment II is: the water inlet function unit includes a water inlet connector 207 arranged on the base body 201 and communicated with the upper chamber 204, and the water level monitoring unit includes a liquid level measurement connector 208 communicated with the upper chamber 204.

The water inlet connector 207 of the drainage assembly 200 is communicated with a water supply tube 500. The water supply tube 500 can be communicated with an external water source. The liquid level measurement connector 208 of the drainage assembly 200 is connected to a monitoring mechanism configured to monitor a liquid level height in the fruit and vegetable sink 100, that is, the monitoring mechanism identifies liquid level height data in the fruit and vegetable sink 100, such that the measurement results are fed back to a terminal device or software. The monitoring mechanism can take various executive actions after monitoring that the liquid level height exceeds the limit. For example, the controller of the monitoring mechanism can control closing of a water inlet switch according to a liquid level height feedback signal, or control opening of a drainage valve on the drainer, or send monitoring information to the corresponding software loaded on the user's mobile phone, or display liquid level information in the display screen exposed on the fruit and vegetable sink 100, or issue a prompt sound. After the monitoring mechanism monitors the liquid level height signal, actions or early warning of various actuators or software realized after signal processing by using various the prior art should belong to an optimization solution derived from the technical solution based on the present embodiment, and should fall within the protection scope of the present embodiment.

Embodiment IV

The basic structure is the same as the Embodiment III, except that: as shown in FIG. 2 and FIG. 3, the base body 201 is arranged in a vertical direction.

The input port 202 is located at an upper end of the base body 201, and the output port 203 is located at a lower end of the base body 201.

The water inlet connector 207 is located above the liquid level measurement connector 208 in the vertical direction.

Embodiment V

The basic structure is the same as the Embodiment III, except that: as shown in FIG. 3, an axis of the water inlet connector 207 extends in a left-right direction, and an axis of the liquid level measurement connector 208 extends in a direction perpendicular to the paper surface. Projection lines of the axes of the water inlet connector 207 and the liquid level measurement connector 208 in a same horizontal plane intersect, and the two projection lines have an included angle greater than 45°.

Preferably, the projection lines of the axes of the water inlet connector 207 and the liquid level measurement connector 208 in a same horizontal plane are perpendicular, that is, the two projection lines have an included angle equal to 90°.

The above included angle in the present embodiment refers to an included angle greater than or equal to 0° and less than or equal to 90°.

Embodiment VI

The basic structure is the same as the Embodiment II, except that: as shown in FIG. 3, a bottom of the upper chamber 204 shrinks inward in a horizontal direction to form a narrow region 204-1. A cross-sectional area of the narrow region 204-1 in the horizontal direction is less than a cross-sectional area of the upper chamber 204 located above the narrow region 204-1. The switch mechanism 206 is arranged between the narrow region 204-1 of the upper chamber 204 and the lower chamber 205 to connect or disconnect the narrow region 204-1 and the lower chamber 205. The liquid level measurement connector 208 is communicated with the narrow region 204-1.

Embodiment VII

The basic structure is the same as the Embodiment VI, except that: as shown in FIG. 3, an inner side wall of the narrow region 204-1 is transitionally connected to an inner side wall of the upper chamber 204 located above the narrow region 204-1 through a transition surface 209. The transition surface 209 is inclined. An end of the transition surface 209 connected to the inner side wall of the upper chamber 204 is higher than the other end of the transition surface 209 connected to the inner side wall of the narrow region 204-1 in the vertical direction.

Embodiment VIII

The basic structure is the same as the Embodiment VII, except that: the water inlet connector 207 faces the transition surface 209. Specifically, an extension line of the axis of the water inlet connector 207 intersects with the transition surface 209, such that water flowing from the water inlet connector 207 impacts on the transition surface 209, and drives the water flow toward the position of the input port 202 through the guiding effect of the transition surface 209, and the resistance during water supply is small and the fluidity is good. In addition, since the liquid level measurement connector 208 is connected to the narrow region 204-1, and the narrow region 204-1 is located below the transition surface 209, the water in the water inlet connector 207 is introduced into the upper chamber to reduce the influence of the flow of water on the measurement accuracy of the liquid level measurement connector 208.

Embodiment IX

The basic structure is the same as the Embodiment III, except that: as shown in FIG. 4, the overflow device 300 is installed on the outer side wall of the fruit and vegetable sink 100 close to the cleaning sink 400, such that the overflow device 300 has good concealment and the damage of the overflow device 300 caused by touching the overflow device 300 during transportation and installation is avoided.

Embodiment X

The basic structure is the same as the Embodiment IX, except that: the overflow device 300 includes a shell 301. An overflow channel 302 is arranged in the shell 301. Two ends of the overflow channel 302 are communicated with an overflow port 303 located at an upper part of the shell 301 and a drainage port 304 located at a lower part of the shell 301. A measurement flow channel 305 is arranged in the shell 301. A lower end of the measurement flow channel 305 is communicated with a liquid level connector 306 located at the lower part of the shell 301, and an upper end of the measurement flow channel 305 is communicated with the overflow port 303. A connection position of the measurement flow channel 305 and the overflow port 303 is higher than a connection position of the overflow channel 302 and the overflow port 303 in the vertical direction. The monitoring mechanism is arranged on the shell 301 of the overflow device 300, and is configured to monitor a liquid level height in the measurement flow channel 305.

The overflow port 303 in the above overflow device 300 is communicated with an overflow hole formed in advance in the wall of the fruit and vegetable sink 100.

The liquid level connector 306 in the above overflow device 300 and the liquid level measurement connector 208 in the drainage assembly 200 are communicated through a measurement water tube 600, such that the inner cavity of the fruit and vegetable sink 100, the upper chamber 204 in the drainage assembly 200, the narrow region 204-1 in the drainage assembly 200, the liquid level measurement connector 208, the measurement water tube 600, the liquid level connector 306 in the overflow device 300, the overflow channel 302 in the overflow device 300, and the overflow port 303 are communicated sequentially to form an overall U-shaped passage. Based on the phenomenon that the liquid level is the same under the action of its own gravity, the monitoring mechanism only needs to monitor the liquid level height in the measurement flow channel 305 to know the liquid level height in the fruit and vegetable sink 100.

Embodiment XI

The basic structure is the same as the Embodiment X, except that: the shell 301 is provided with a transition cavity 307. The overflow port 303 is communicated with the transition cavity 307. The transition cavity 307 is provided with a first connecting port 307-1 communicated with the measurement flow channel 305 and a second connecting port 307-2 communicated with the overflow channel 302 separately. A height of the first connecting port 307-1 in the vertical direction is higher than that of the second connecting port 307-2.

Preferably, the overflow port 303 is arranged on the back of the shell 301, and a width dimension of the transition cavity 307 in the vertical direction matches a width dimension of the overflow port 303 in the vertical direction, such that the second connecting port 307-2 is flush with a lower edge of the overflow port 303, and the first connecting port 307-1 is flush with an upper edge of the overflow port 303.

Embodiment XII

The basic structure is the same as the Embodiment XI, except that: the overflow port 303 is arranged on the side of the shell 301, such that the overflow port 303 itself has a certain size range in the vertical direction. A connecting tubing 308 is arranged in the shell 301 between the measurement flow channel 305 and the transition cavity 307. One end of the connecting tubing 308 is communicated with the upper end of the measurement flow channel 305, and the other end of the connecting tubing 308 is communicated with a top of the transition cavity 307. An upper end of the overflow channel 302 is communicated with a bottom of the transition cavity 307.

Since the overflow port 303 itself has a certain size range in the height direction, when the water in the fruit and vegetable sink 100 overflows to the height of the overflow port 303, it will preferentially overflow from the bottom of the overflow port 303 to the overflow channel 302. At this time, although the upper end of the measurement flow channel 305 is communicated with the overflow port 303, because the overflow port 303 has a certain height dimension, the water in the sink body of the fruit and vegetable sink 100 will not be poured into the measurement flow channel 305.

Preferably, the overflow port 303 is located on the side wall of the shell 301, and the overflow port 303 is sequentially divided into an upper half overflow port and a lower half overflow port from top to bottom along the horizontal plane of the middle position. The overflow channel 302 is communicated with the lower half overflow port, and the measurement flow channel 305 is communicated with the upper half overflow port.

Embodiment XIII

The basic structure is the same as the Embodiment XII, except that: the monitoring mechanism includes a floater 309 arranged in the measurement flow channel 305, and a monitoring unit arranged on the shell 301 and configured to monitor a position of the floater 309.

The monitoring unit includes a magnetic element arranged on the floater 309 and a plurality of Hall elements or a plurality of reed switches arranged on the shell 301, and all of the Hall elements or all of the reed switches are arranged sequentially in a length direction of the measurement flow channel 305. A detachable installation plate 310 is fixed on the shell 301, and all of the Hall elements are arranged sequentially on the installation plate 310 in the length direction of the measurement flow channel 305 and are fixedly connected to the installation plate 310.

Embodiment XIV

The basic structure is the same as the Embodiment X, except that: the shell 301 includes a bottom shell 301-1 and a cover plate 301-2 covering the bottom shell 301-1. The bottom shell 301-1 is provided with a plurality of partitions. The inner cavity of the bottom shell 301-1 is separated into a plurality of chambers by the partitions. When the cover plate 301-2 is matched with the bottom shell 301-1, the cover plate 301-2 closes the chambers in the bottom shell 301-1, such that the cover plate 301-2 and the bottom shell 301-1 enclose the transition cavity 307, the measurement flow channel 305 and the overflow channel 302.

Figure 11:
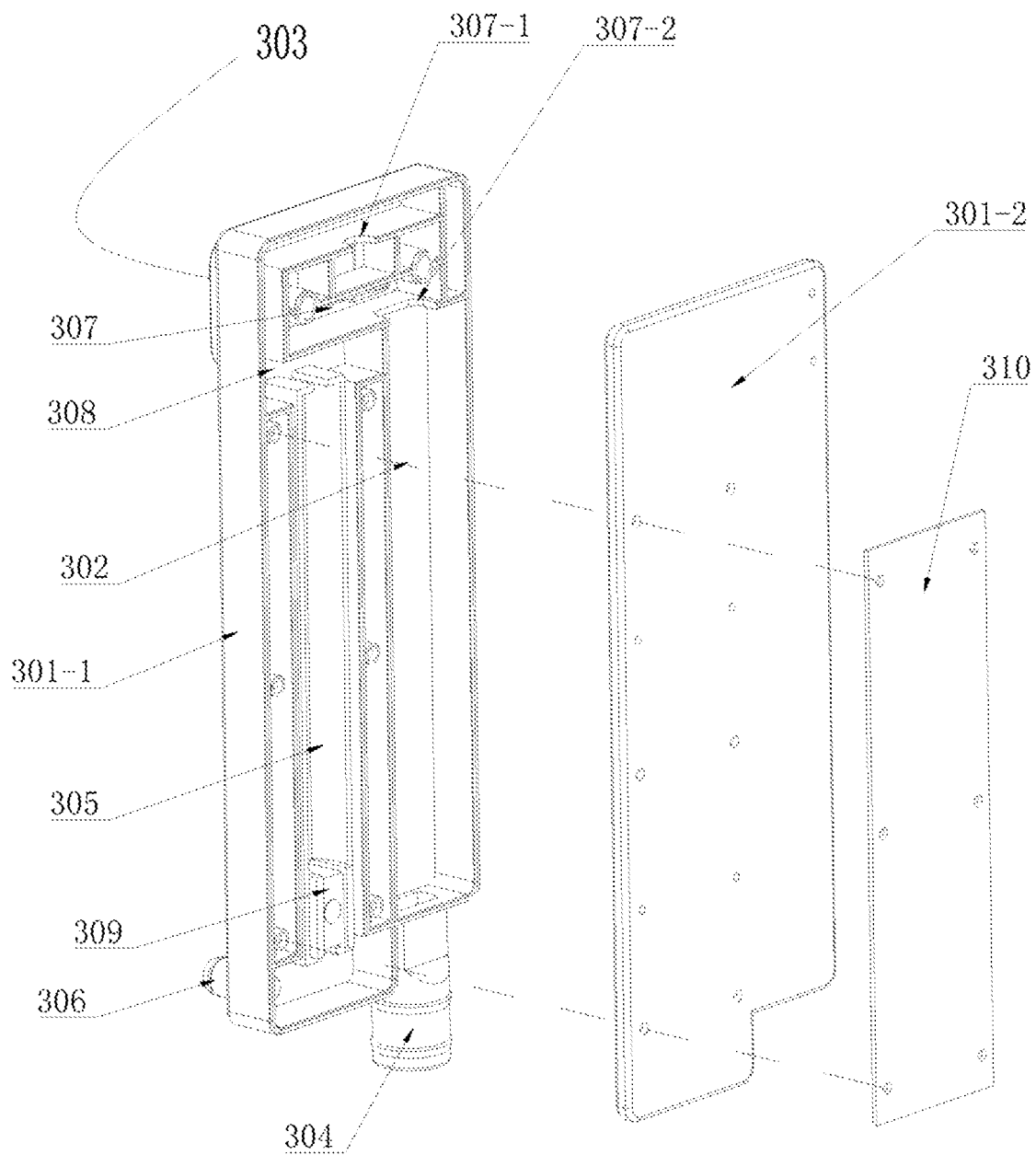
FIG. 11 is an explosion diagram of the overflow device of the present disclosure.
Figure 12:
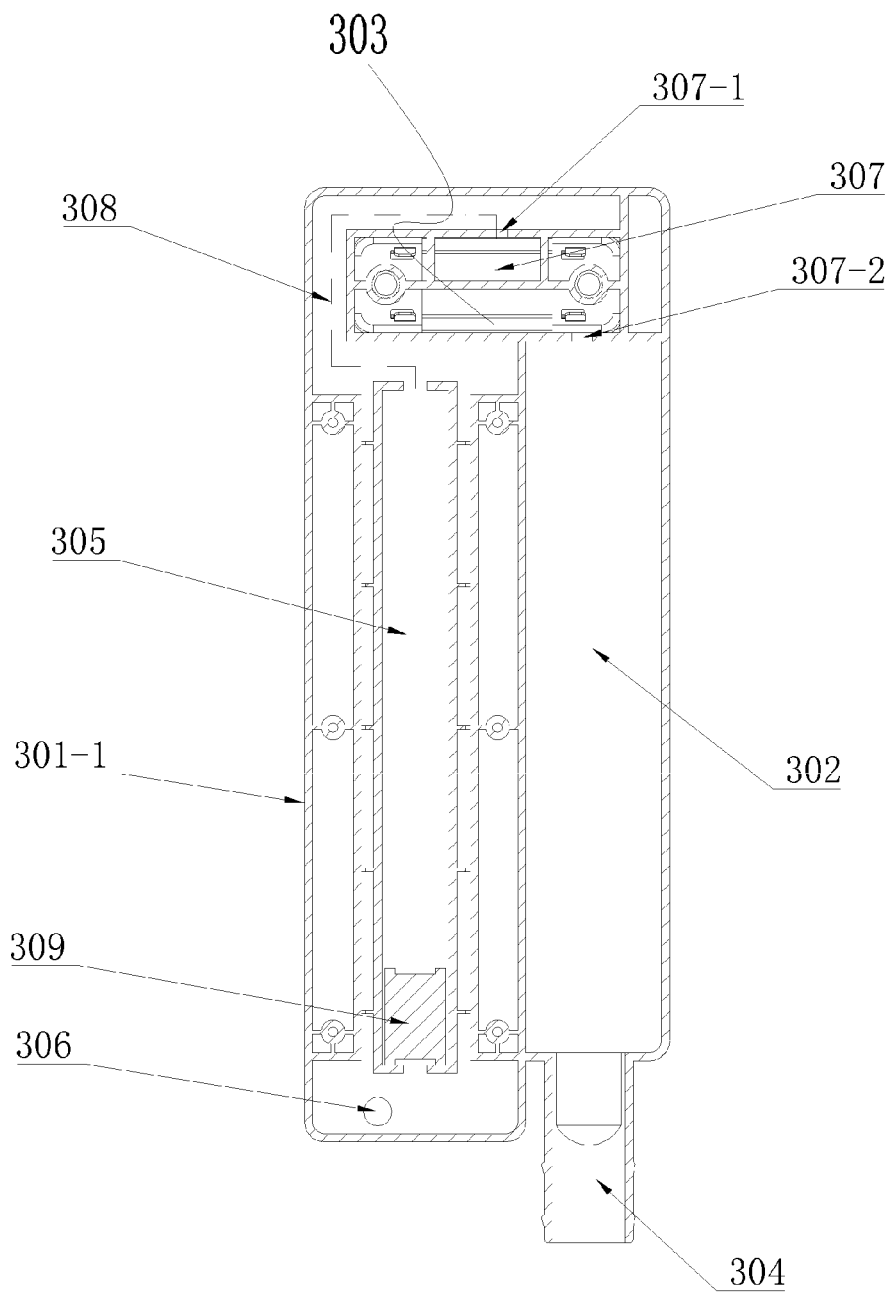
FIG. 12 is a schematic diagram of an internal structure of the overflow device of the present disclosure after a cover plate is removed.

As shown in FIG. 13, the bottom shell 301-1 has a rectangular structure. The transition cavity 307, the measurement flow channel 305, and the overflow channel 302 are arranged in a zigzag shape. The measurement flow channel 305 and the overflow channel 302 are arranged side by side. The transition cavity 307 is located above the measurement flow channel 305 and the overflow channel 302. As shown in FIG. 11, the overflow port 303 is arranged at a position corresponding to the transition cavity 307 on the back of the bottom shell 301-1 away from the cover plate 301-2.

It should be noted herein that in the description of the present disclosure, the terms "central", "longitudinal", "transverse", "length", "width", "thickness", "upper", "lower", "front", "back", "left", "right", "vertical", "horizontal", "top", "bottom", "inner", "outer", "clockwise", "anticlockwise", "axial", "radial" and "circumferential" etc. are used to indicate orientations shown in the accompanying drawings. These terms are merely intended to facilitate a simple description of the present disclosure, rather than to indicate or imply that the mentioned apparatus or elements must have the specific orientation or be constructed and operated in the specific orientation. Therefore, these terms may not be construed as a limitation to the present disclosure.

Moreover, the terms such as "first" and "second" are used only for the purpose of description and should not be construed as indicating or implying a relative importance, or implicitly indicating a quantity of indicated technical features. Thus, features defined with "first" and "second" may explicitly or implicitly include one or more of the features. In the description of the present disclosure, "a plurality of" means two or more, unless otherwise specifically defined.

In the present disclosure, unless otherwise clearly specified, the terms "installation", "interconnection", "connection" and "fixation" etc. are intended to be understood in a broad sense. For example, the "connection" may be a fixed connection, removable connection or integral connection; may be a mechanical connection or electrical connection; may be a direct connection or indirect connection using a medium; and may be a communication or interaction between two elements. Those of ordinary skill in the art may understand specific meanings of the above terms in the present disclosure based on a specific situation.

In the present disclosure, unless otherwise clearly specified, when it is described that a first feature is "above" or "below" a second feature, it indicates that the first and second features are in direct contact or the first and second features are in indirect contact through a medium. In addition, when it is described that the first feature is "over", "above" and "on" the second feature, it indicates that the first feature is directly or obliquely above the second feature, or simply indicates that the first feature is higher than that of the second feature. When it is described that a first feature is "under", "below" or "beneath" a second feature, it indicates that the first feature is directly or obliquely under the second feature or simply indicates that the first feature is lower than the second feature.

In this specification, descriptions of reference terms such as "one embodiment", "some embodiments", "an example", "a specific example" and "some examples" indicate that specific features, structures, materials or characteristics described in combination with the embodiment(s) or example(s) are included in at least one embodiment or example of the present disclosure. In this specification, schematic representation of the above terms is not necessarily directed to the same embodiment or example. Moreover, the specific features, structures, materials or characteristics described may be combined in a suitable manner in any one or more embodiments or examples. In addition, those skilled in the art may combine different embodiments or examples described in this specification and characteristics of the different embodiments or examples without mutual contradiction.

Although the embodiments of the present disclosure have been illustrated and described above, it will be appreciated that the above embodiments are illustrative and should not be construed as limiting the scope of the present disclosure. Changes, modifications, substitutions and variations can be made to the above embodiments by those of ordinary skill in the art within the scope of the present disclosure.

Various changes and modifications will undoubtedly become apparent to those skilled in the art upon reading the above description. Therefore, the appended claims should be construed to cover all changes and modifications of the true intent and scope of the present disclosure. Any and all equivalent ranges and content within the scope of the claims should still be deemed to fall within the intent and scope of the present disclosure.

What is claimed is:

1. A drainage assembly, comprising a base body, wherein two ends of the base body are provided with an input port and an output port respectively, the input port is communicated with the output port by a flow channel located in the base body, and the flow channel comprises an upper chamber communicated with the input port and a lower chamber communicated with the output port; the base body is provided with a switch mechanism, wherein the switch mechanism is configured to control connection and disconnection between the upper chamber and the lower chamber, and the base body is provided with a water inlet connector and a liquid level measurement connector, wherein the water inlet connector and the liquid level measurement connector are separately communicated with the upper chamber.

2. The drainage assembly according to claim 1, wherein the base body is arranged in a vertical direction;
   the input port is located at an upper end of the base body, and the output port is located at a lower end of the base body; and
   the water inlet connector is located above the liquid level measurement connector in the vertical direction.

3. The drainage assembly according to claim 2, wherein projection lines of axes of the water inlet connector and the liquid level measurement connector in a same horizontal plane intersect, and the projection lines of the axes of the water inlet connector and the liquid level measurement connector in the same horizontal plane have an included angle greater than 45°.

4. The drainage assembly according to claim 1, wherein a bottom of the upper chamber shrinks inward in a horizontal direction to form a narrow region, a cross-sectional area of the narrow region in the horizontal direction is less than a cross-sectional area of the upper chamber located above the narrow region, the switch mechanism is arranged between the narrow region of the upper chamber and the lower chamber to connect or disconnect the narrow region and the lower chamber, and the liquid level measurement connector is communicated with the narrow region.

5. The drainage assembly according to claim 4, wherein an inner side wall of the narrow region is transitionally connected to an inner side wall of the upper chamber located above the narrow region through a transition surface, the transition surface is inclined, and a first end of the transition surface is higher than a second end of the transition surface in the vertical direction, wherein the first end of the transition surface is connected to the inner side wall of the upper chamber, and the second end of the transition surface is connected to the inner side wall of the narrow region.

6. The drainage assembly according to claim 5, wherein the water inlet connector faces the transition surface.

7. A sink, comprising a fruit and vegetable sink, wherein a bottom of the fruit and vegetable sink is provided with a water outlet, and the drainage assembly according to claim 1 is installed at the bottom of the fruit and vegetable sink;
the input port of the drainage assembly is communicated with the water outlet at the bottom of the fruit and vegetable sink, and the output port of the drainage assembly is communicated with a drainage tube; and
the water inlet connector of the drainage assembly is communicated with a water supply tube, and the liquid level measurement connector of the drainage assembly is connected to a monitoring mechanism, wherein the monitoring mechanism is configured to monitor a liquid level height in the fruit and vegetable sink.

8. The sink according to claim 7, wherein an overflow device is installed on an outer side of a wall of the fruit and vegetable sink, and a measurement flow channel is arranged in the overflow device; a lower end of the measurement flow channel is communicated with the liquid level measurement connector on the drainage assembly, and an upper end of the measurement flow channel is communicated with an inner cavity of the fruit and vegetable sink; and the monitoring mechanism is arranged on the overflow device, and the monitoring mechanism is configured to monitor a liquid level height in the measurement flow channel.

9. The sink according to claim 8, wherein the monitoring mechanism comprises:
a floater arranged in the measurement flow channel, and
a monitoring unit arranged on the overflow device and configured to monitor a position of the floater.

10. The sink according to claim 9, wherein the monitoring unit comprises a magnetic element arranged on the floater and a plurality of Hall elements or a plurality of reed switches arranged on the overflow device, and the plurality of the Hall elements or the plurality of reed switches are arranged sequentially in a length direction of the measurement flow channel.

11. The sink according to claim 7, wherein the base body is arranged in a vertical direction;
the input port is located at an upper end of the base body, and the output port is located at a lower end of the base body; and
the water inlet connector is located above the liquid level measurement connector in the vertical direction.

12. The sink according to claim 11, wherein projection lines of axes of the water inlet connector and the liquid level measurement connector in a same horizontal plane intersect, and the projection lines of the axes of the water inlet connector and the liquid level measurement connector in the same horizontal plane have an included angle greater than 45°.

13. The sink according to claim 7, wherein a bottom of the upper chamber shrinks inward in a horizontal direction to form a narrow region, a cross-sectional area of the narrow region in the horizontal direction is less than a cross-sectional area of the upper chamber located above the narrow region, the switch mechanism is arranged between the narrow region of the upper chamber and the lower chamber to connect or disconnect the narrow region and the lower chamber, and the liquid level measurement connector is communicated with the narrow region.

14. The sink according to claim 13, wherein an inner side wall of the narrow region is transitionally connected to an inner side wall of the upper chamber located above the narrow region through a transition surface, the transition surface is inclined, and a first end of the transition surface is higher than a second end of the transition surface in the vertical direction, wherein the first end of the transition surface is connected to the inner side wall of the upper chamber, and the second end of the transition surface is connected to the inner side wall of the narrow region.

15. The sink according to claim 14, wherein the water inlet connector faces the transition surface.

* * * * *